United States Patent
Kuriya et al.

(10) Patent No.: US 10,185,405 B2
(45) Date of Patent: Jan. 22, 2019

(54) INFORMATION PROCESSING APPARATUS AND METHOD TO REMOTELY CONTROL A TARGET

(75) Inventors: Shinobu Kuriya, Kanagawa (JP); Tetsuro Goto, Tokyo (JP); Masatoshi Ueno, Kanagawa (JP); Kenichi Kabasawa, Saitama (JP); Tatsuya Suzuki, Kanagawa (JP); Tsubasa Tsukahara, Tokyo (JP); Toshiyuki Nakagawa, Kanagawa (JP); Hideo Kawabe, Saitama (JP)

(73) Assignee: Sony Corporation, Tokyo (JP)

( * ) Notice: Subject to any disclaimer, the term of this patent is extended or adjusted under 35 U.S.C. 154(b) by 747 days.

(21) Appl. No.: 13/553,040

(22) Filed: Jul. 19, 2012

(65) Prior Publication Data

US 2013/0027295 A1 Jan. 31, 2013

(30) Foreign Application Priority Data

Jul. 27, 2011 (JP) .................................. 2011-164068

(51) Int. Cl.
| | |
|---|---|
| *G06F 3/0346* | (2013.01) |
| *A63F 13/211* | (2014.01) |
| *G06K 9/00* | (2006.01) |
| *G09B 19/00* | (2006.01) |

(52) U.S. Cl.
CPC .......... *G06F 3/0346* (2013.01); *A63F 13/211* (2014.09); *G06K 9/00342* (2013.01); *G09B 19/0038* (2013.01)

(58) Field of Classification Search
CPC .......................... G06F 3/0346; G06K 9/00342

USPC .......................................................... 345/156
See application file for complete search history.

(56) References Cited

U.S. PATENT DOCUMENTS

| | | | | |
|---|---|---|---|---|
| 2002/0158598 A1* | 10/2002 | Oka | ........................ | B29C 45/76 318/560 |
| 2007/0280659 A1* | 12/2007 | Zhao | ...................... | G03B 17/00 396/53 |
| 2008/0064498 A1* | 3/2008 | Okamura | ........................ | 463/34 |
| 2008/0242385 A1* | 10/2008 | Miyamoto | ........................ | 463/1 |
| 2008/0254898 A1* | 10/2008 | Endo | ............................... | 463/43 |
| 2009/0289958 A1* | 11/2009 | Kim | ..................... | G06F 3/04886 345/649 |
| 2010/0245239 A1* | 9/2010 | Sternberg | ....................... | 345/156 |
| 2010/0248833 A1* | 9/2010 | Okamura | ........................ | 463/36 |
| 2010/0267443 A1* | 10/2010 | Shimamura | .............. | A63F 13/06 463/23 |
| 2011/0074665 A1* | 3/2011 | Konishi | ................... | A63F 13/02 345/156 |
| 2012/0302320 A1* | 11/2012 | Kim | ...................... | A63F 9/0468 463/22 |

FOREIGN PATENT DOCUMENTS

JP 2009-125509 A 6/2009

* cited by examiner

*Primary Examiner* — Chun-Nan Lin
(74) *Attorney, Agent, or Firm* — Chip Law Group (57) ABSTRACT

There is provided an information processing apparatus including an acquisition unit acquiring data on at least one of an acceleration or an angular velocity of a controller operated by a user, and a determination unit determining at least one of a velocity of the controller or a trajectory of the controller based on the acquired data on the at least one of the acceleration or the angular velocity.

20 Claims, 9 Drawing Sheets

FIG. 1

CONTROL TARGET (OBJECT)

<1. APPROXIMATION BY COUNTING NUMBER OF MAXED OUT FRAMES>

(b)

<2. MAX VALUE OF CHANGE IN ACCELERATION>

(c)

<3. MAX VALUE OF ANGULAR VELOCITY>

INFORMATION PROCESSING APPARATUS AND METHOD TO REMOTELY CONTROL A TARGET

BACKGROUND

The present disclosure relates to an information processing apparatus, an information processing method, and a program carrying out processing based on a detected value or values detected using a pressure sensor or the like.

In the past, a system has been developed where an acceleration sensor and/or an angular velocity sensor is/are incorporated into a ball to enable the trajectory of the ball when thrown, hit, or the like to be traced (see for example Japanese Laid-Open Patent Publication No. 2009-125509). By using this system, it is possible for the user to analyze trajectory data of a pitch thrown by himself/herself for example, and to understand his/her form and motion during pitching, thereby making it easier for the user to improve his/her technique.

SUMMARY

The system in the cited publication is a ball-shaped device in which various sensors are incorporated to produce the sensor values required to enable the user to improve his/her technique. However, such device is not a controller in which a pressure sensor is incorporated and which is used as a human interface (i.e., to input or to control something else).

Accordingly, there is demand for an information processing technology that enables the user to intuitively carry out remote operations of a control target using a controller incorporating sensors as a human interface.

According to an embodiment of the present disclosure, there is provided an information processing apparatus which includes an acquisition unit acquiring data on at least one of an acceleration or an angular velocity of a controller operated by a user, and a determination unit determining at least one of a velocity of the controller or a trajectory of the controller based on the acquired data on the at least one of the acceleration or the angular velocity.

According to another embodiment of the present disclosure, there is provided an information processing method which includes acquiring data on at least one of an acceleration or an angular velocity of a controller operated by a user, and determining at least one of a velocity of the controller or a trajectory of the controller based on the acquired data on the at least one of the acceleration or the angular velocity.

According to another embodiment of the present disclosure, there is provided a program for causing a computer to execute processing of acquiring data on at least one of an acceleration or an angular velocity of a controller operated by a user, and processing of determining at least one of a velocity of the controller or a trajectory of the controller based on the acquired data on the at least one of the acceleration or the angular velocity.

As described above, according to the present disclosure, it is possible to enable the user to intuitively carry out remote operations of a control target using a controller incorporating sensors as a human interface.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 1:
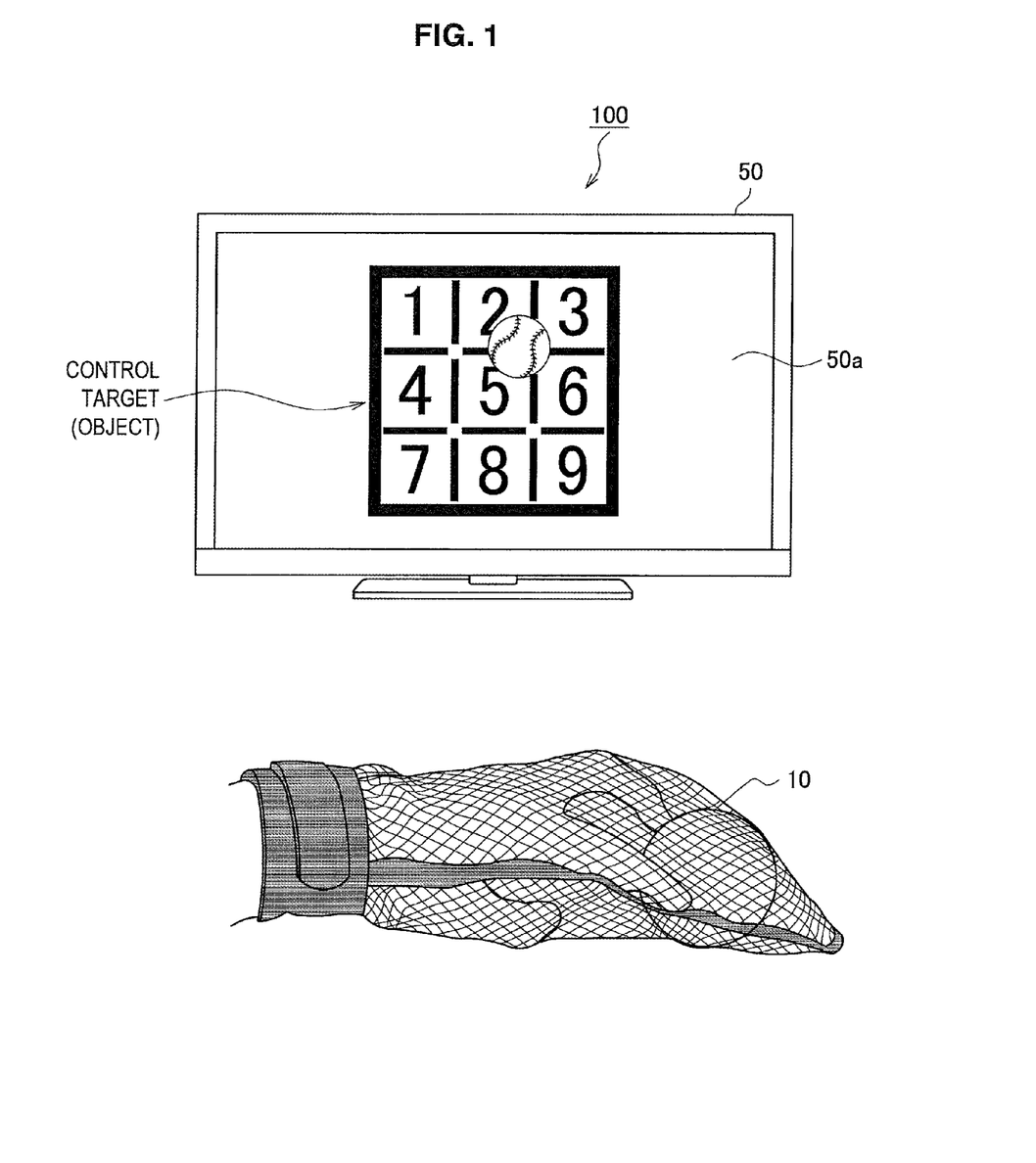
FIG. 1 is a diagram showing a control system according to an embodiment of the present disclosure.

Preferred embodiments of the present disclosure are described in the order indicated below.
1. Overall Configuration of System
2. Configuration of Controller
3. Configuration of Display Apparatus
4. Fundamental Operation of Control System
5. Throw Determination Process
6. Pitch Determination Using Sensor Values
7. Modifications 1. Overall Configuration of System First, a control system according to an embodiment of the present disclosure will be described with reference to FIG. 1. FIG. 1 is a diagram showing a control system 100 including a controller 10 according to an embodiment of the present disclosure. The control system 100 includes the controller 10 and the display apparatus 50.

The controller 10 has a physical form and is operated by the user to change the display content of an object displayed on the display apparatus 50. For example, the controller 10 is a device subjected to input operations by the user to operate a control target displayed on a display 50a of the display apparatus 50.

The controller 10 is ball-shaped. The size of the controller 10 is set slightly larger or slightly smaller than the size of a baseball, with a diameter in the range of around 50 to 100 mm, for example. By doing so, the controller 10 has a size that is easy to manipulate when gripped by the user. However, the diameter of the controller 10 is not limited to the range given above and it should be obvious that other values can be used. Also, although the controller 10 is formed in the shape of a ball in this embodiment, the present disclosure is not limited to this. However, the controller 10 should preferably have a shape that enables the user to make intuitive remote operations of the control target in an application. The display apparatus 50 controls the displaying of the control target on the display in accordance with an operation of the controller 10 made by the user.

By using this configuration, with the control system 100 according to the present embodiment, as shown at the bottom in FIG. 1, the user attaches a throwing net or the like to his/her hand and then moves his/her arm to throw the controller 10 inside the net. Based on sensor values detected for this operation by sensors incorporated in the controller 10, an application is launched and operated. In the application launched in the present embodiment, a pitching trainer game is played where the user throws the controller 10 inside the throwing net to have a virtual ball displayed in two or three dimensions on the screen knock out one of multiple targets displayed on the same screen. In this way, with the control system 100 according to the present embodiment, by operating the controller 10, the user is capable of playing an intuitive game where it is possible to remotely operate a control target displayed on the display 50a. Note that the display apparatus 50 is one example of an "information processing apparatus" that controls the displaying of an object (or "control target", here a pitching trainer game) in accordance with the pitching velocity and/or pitch type of the controller 10 based on detection values produced by detecting the movement of the controller operated by the user.

2. Configuration of Controller

Hardware Configuration

Figure 2:
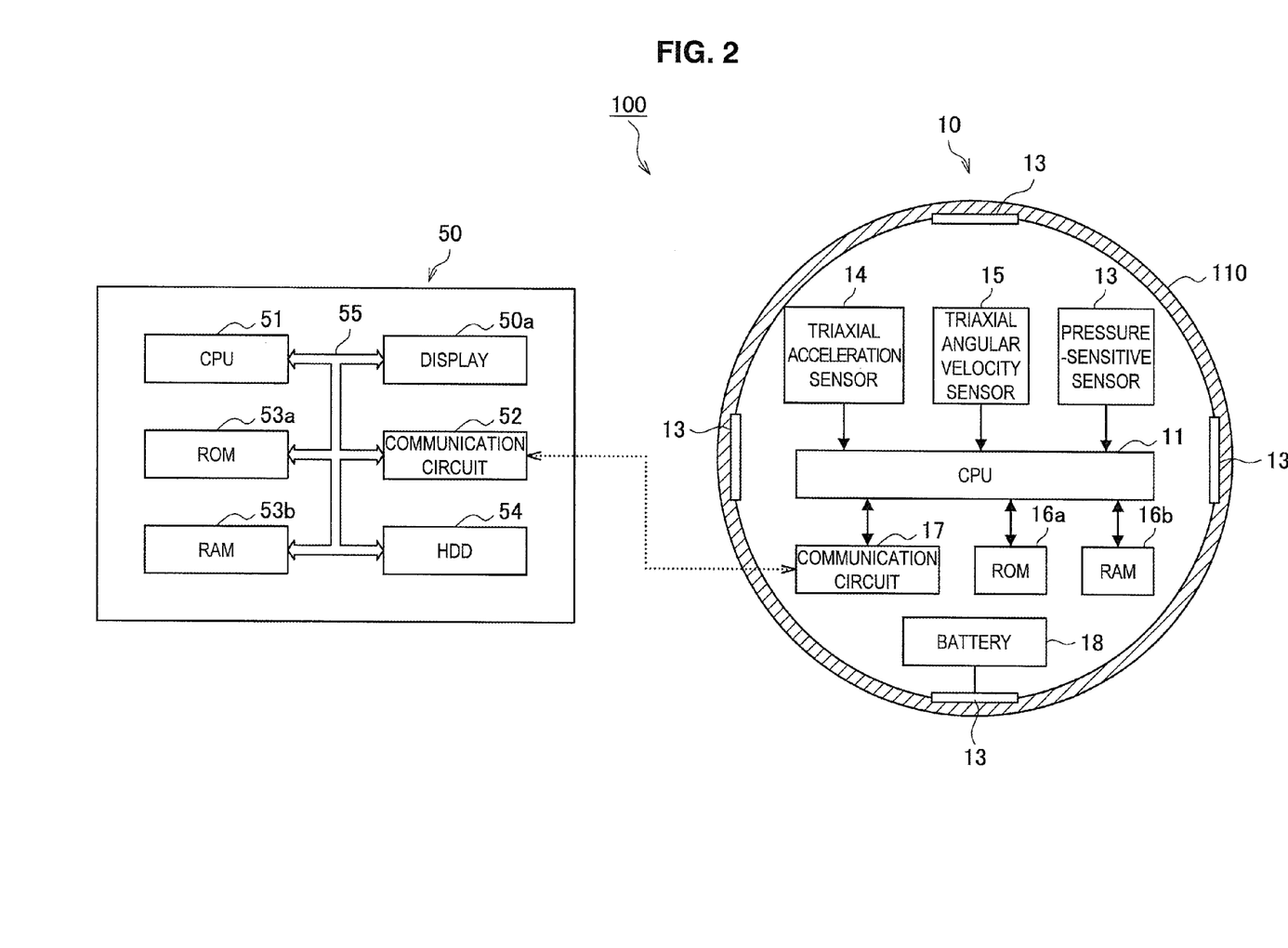
FIG. 2 is a diagram showing the hardware configuration of a controller and a display apparatus according to the present embodiment.
Figure 3:
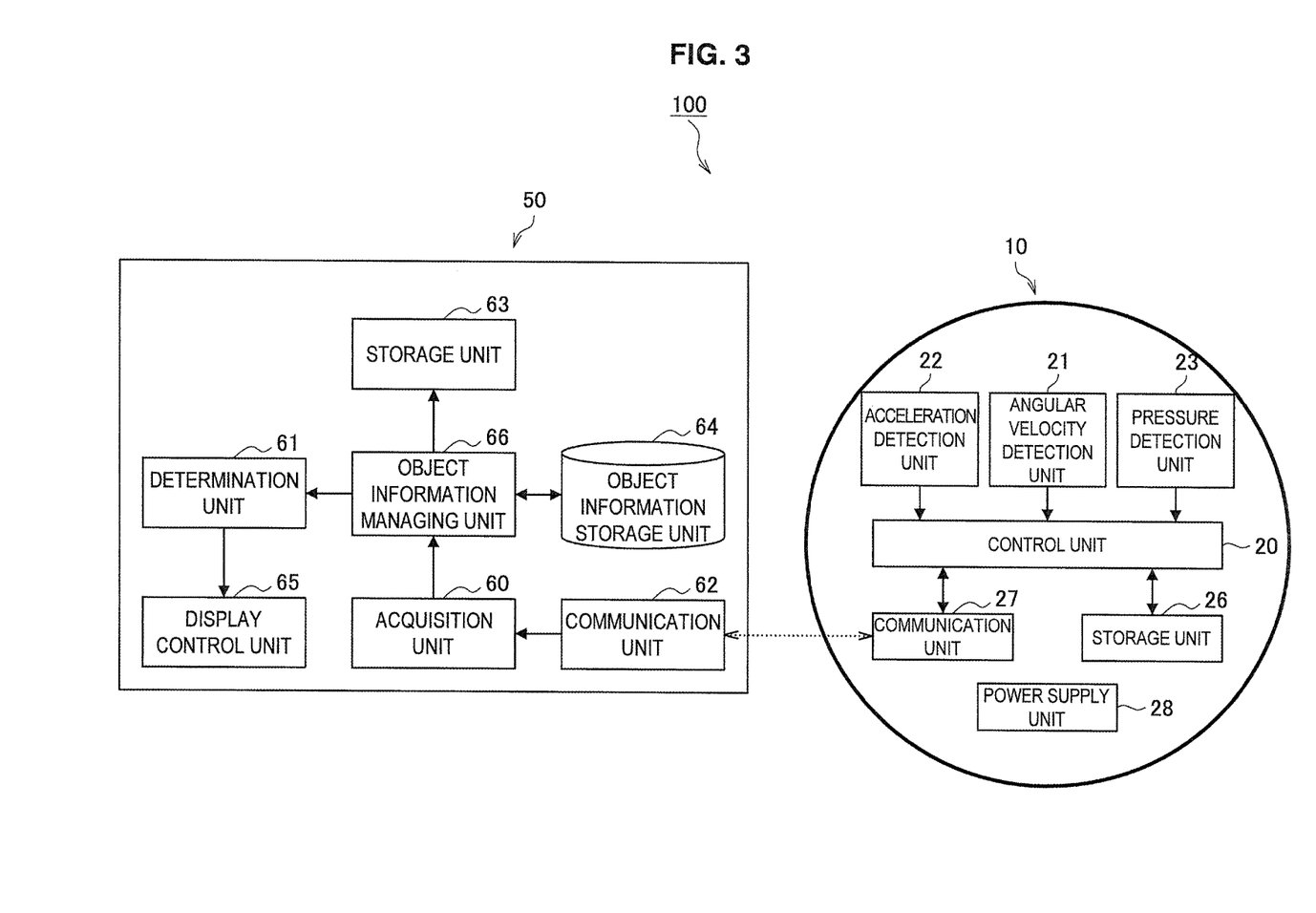
FIG. 3 is a diagram showing the functional configuration of the controller and the display apparatus according to the present embodiment.

Next, the configuration of the controller 10 according to the present embodiment will be described in the order of hardware configuration, functional configuration with reference to FIGS. 2 and 3. The hardware configuration of the controller 10 is shown on the right in FIG. 2. The controller 10 includes a triaxial acceleration sensor 14, a triaxial angular velocity sensor 15 as a rotation sensor, pressure-sensitive sensors 13, a CPU 11, a ROM (Read Only Memory) 16a, a RAM (Random Access Memory) 16b, a communication circuit 17, a battery 18, and the like.

The triaxial acceleration sensor 14, the triaxial angular velocity sensor 15, the CPU 11, the communication circuit 17, the ROM 16a, and the RAM 16b are mounted on a circuit board, not shown. The circuit board on which the electronic components such as the CPU 11 are mounted is provided together with the battery 18 in a cavity formed inside a main body of the controller 10.

Such sensors and the CPU 11 and the like are disposed inside a casing 110 of the ball so as to be fixed to the casing 110. A plurality of the pressure-sensitive sensors 13 are attached to an inner surface of the casing 110, with such pressure sensors detecting locations where the user applies pressure and the magnitude of such pressure.

The triaxial acceleration sensor 14 and the triaxial angular velocity sensor 15 are examples of "sensors" for the present disclosure and detect movement through space of the controller 10. The triaxial acceleration sensor 14 detects acceleration on three axes that are perpendicular to each other and outputs acceleration values in keeping with the detected acceleration to the CPU 11. The triaxial angular velocity sensor 15 detects angular velocity on three axial directions that are perpendicular to each other and outputs angular velocity values in keeping with the detected angular velocity to the CPU 11.

The pressure-sensitive sensors 13 are one example of a pressure sensor that outputs pressure values in keeping with the magnitude of the forces with which the user grips the controller 10 to the CPU 11. As the pressure-sensitive sensors 13, as one example sensors where the pressure is expressed according to changes in electrical resistance are used.

To control the control target, the CPU 11 carries out various computations based on the acceleration values, angular velocity values, and pressure values outputted from the triaxial acceleration sensor 14, the triaxial angular velocity sensor 15, and the pressure-sensitive sensors 13. For example, the CPU 11 calculates a moved amount and a rotated amount of the controller 10 in space based on the acceleration values and angular velocity values. Also, the CPU 11 calculates the magnitudes of the forces applied by the user gripping the controller 10, the positions where such forces are applied, and the like based on the pressure values outputted from the pressure-sensitive sensors 13.

The ROM 16a is a nonvolatile memory and stores various programs that are necessary for the processing of the CPU 11. The RAM 16b is a volatile memory and is used as a workspace of the CPU 11.

The communication circuit 17 includes an antenna or the like and transmits a variety of information to the display apparatus 50 based on control by the CPU 11. As examples, the communication circuit 17 transmits information on the moved and rotated amounts in space of the controller 10 and information on the magnitude of the forces applied in gripping the controller 10, the positions at which such forces are applied, and the like to the display apparatus 50. Note that the communication circuit 17 is also capable of receiving information transmitted from the display apparatus 50.

As one example, a rechargeable cell is used as the battery 18.

Functional Configuration

Next, the functional configuration of the controller 10 according to the present embodiment will be described with reference to the functional configuration diagram on the right in FIG. 3. The controller 10 includes an acceleration detection unit 22, an angular velocity detection unit 21, a pressure detection unit 23, a control unit 20, a storage unit 26, a communication unit 27, and a power supply unit 28.

The acceleration detection unit 22 detects the acceleration applied to the controller 10 based on the output signal (sensor value) from the triaxial acceleration sensor 14.

The angular velocity detection unit 21 detects the angular velocity of the controller 10 based on the output signal (sensor value) from the triaxial angular velocity sensor 15.

The pressure detection unit 23 detects the pressure applied to the controller 10 based on the output signal (sensor value) from the pressure-sensitive sensors 13.

The control unit 20 carries out desired computation based on at least one of the sensor values out of the detected acceleration and the angular velocity. The control unit 20 is also capable of carrying out desired computation based on the detected acceleration, angular velocity, and pressure. As one example, the desired computation may be computation to determine the pitch velocity and pitch type of the controller 10. The control unit 20 may also carry out computation that averages the sensor values or computation that finds the difference between the sensor values and sensor values immediately preceding such sensor values.

The storage unit 26 can be realized as the RAM 16b or the ROM 16a that use a semiconductor memory, a magnetic disk, an optical disc, or the like.

The communication unit 27 transmits and receives information obtained by the various detection units between the controller 10 and the display apparatus 50. The communication unit 27 and a communication unit 62 may be connected by a wired or wireless connection.

The power supply unit 28 uses a rechargeable cell, for example, as the battery 18 and supplies power to the various units.

If the triaxial acceleration sensor 14 that has three perpendicular detection axes and the triaxial angular velocity sensor 15 that has three perpendicular detection axes are incorporated in the controller 10, it will be possible to calculate the acceleration and angular velocity of an object corresponding to movement of the controller 10 in every direction in three-dimensional space. Such computation is typically carried out by an object information managing unit 66 of the display apparatus 50 as described later.

Note that as one example, the functions of the control unit 20 can be realized by the CPU 11 operating according to a program stored in the storage unit 26. This program may be provided by being stored on a storage medium and then written into a storage unit 46 via a driver, not shown, or may be downloaded from a network and stored in the storage unit 46. Also, to realize the functions of the respective units described above, it is possible to use a DSP (Digital Signal Processor) in place of the CPU. Also, the functions of the respective units described above may be realized by operations using software or may be realized by operations using hardware.

It is also unnecessary for the controller 10 to be a perfect sphere as shown in FIG. 1 and the like and the controller 10 may be shaped as a round object or a polyhedron.

3. Configuration of Display Apparatus

Hardware Configuration

Next, the configuration of the display apparatus 50 according to the present embodiment will be described in the order of hardware configuration, functional configuration with reference to FIGS. 2 and 3. The hardware configuration of the display apparatus 50 is shown on the left in FIG. 2. In the same way as a typical computer, the display apparatus 50 includes a CPU 51, a ROM 53a, a RAM 53b, an HDD (Hard Disk Drive) 54, the display 50a, and a communication circuit 52. Such elements are connected by a bus 55.

Based on various information received by the communication circuit 52, the CPU 51 controls the displaying of the control target displayed on the display 50a.

The ROM 53a is a nonvolatile memory and stores various programs that are necessary for the processing of the CPU 51. The RAM 53b is a volatile memory and is used as a workspace of the CPU 51.

The HDD 54 mainly stores object information.

As examples, the display 50a is constructed of a liquid crystal display or an EL (Electro-Luminescence) display. The display 50a may be constructed so as to display two-dimensional images or may be constructed so as to display three-dimensional images. The display 50a displays the control target operated by the controller 10 in two dimensions or in three dimensions.

Examples of a control target displayed in two dimensions include GUI elements such as a pointer, an icon, or a window. An example of a control target displayed in three dimensions is a character image in human or animal form that is displayed in three dimensions. Note that these are mere examples and the control target may be any image that is displayed in two dimensions or in three dimensions.

The communication circuit 52 includes an antenna or the like and receives a variety of information transmitted from the controller 10. The communication circuit 52 is also capable of transmitting signals to the controller 10.

Note that the display apparatus 50 may be a television apparatus that is capable of receiving television broadcasts and the like. Alternatively, if the display apparatus 50 is constructed to display the control target in three dimensions, the display apparatus 50 may be a three-dimensional image display apparatus that displays images that appear to be three-dimensional to the naked eye of the user.

Functional Configuration

Next, the functional configuration of the display apparatus 50 according to the present embodiment will be described with reference to the functional configuration diagram on the left in FIG. 3. The display apparatus 50 includes the communication unit 62, an acquisition unit 60, a determination unit 61, a display control unit 65, an object information managing unit 66, and an object information storage unit 64.

The communication unit 62 receives the information transmitted by the controller 10 from the communication unit 27. The communication unit 62 may also transmit specified information to the communication unit 27.

The acquisition unit 60 acquires data on at least one of the acceleration and the angular velocity of the controller 10 operated by the user. In addition to the acceleration and the angular velocity, the acquisition unit 60 may also acquire data relating to the pressure applied to the controller 10 operated by the user. The acquisition unit 60 acquires sensor values detected by the various sensors inside the controller 10 without amendment or acquires the result of desired computation carried out by the control unit 20 based on such sensor values.

The determination unit 61 determines at least one of the velocity of the controller 10 and the trajectory of the controller 10 based on the acquired data on at least one of the acceleration and the angular velocity. The determination unit 61 may also determine the state in which the controller 10 is gripped by the user based on the acquired pressure applied to the controller 10.

The display control unit 65 controls displaying of an object (the control target) displayed on the display apparatus 50 based on the determined at least one of the velocity of the controller 10 and the trajectory of the controller 10. The display control unit 65 uses various known computational methods based on information (more specifically, sensor values such as acceleration, angular velocity, and pressure) on the position, orientation, three-dimensional form, and the like of the object to realize movement and rotation of the object in various directions on the screen and is also capable of realizing a change in the state (such as the form, size, and/or color) of the object.

The object information managing unit 66 manages object information. Here, the expression "object information" refers to information for displaying the object on the screen and as one example is information relating to the position, orientation, color, three-dimensional form, and the like of the object. The object information storage unit 64 stores the object information using the RAM 53b, for example.

Note that the functions of the determination unit 61, the display control unit 65, and the object information managing unit 66 can be realized for example by the CPU 51 operating in accordance with a program stored in a storage unit 63. This program may be provided by being stored on a storage medium and then written into the storage unit 63 via a driver, not shown, or may be downloaded from a network and stored in the storage unit 63. Also, to realize the functions of the respective units described above, it is possible to use a DSP (Digital Signal Processor) in place of the CPU. Also, the functions of the respective units described above may be realized by operations using software or may be realized by operations using hardware.

Also, although the display apparatus 50 according to the present embodiment is configured so that a control part, which receives information transmitted from the controller 10 and controls the displaying of objects, and the display 50a are integrated, it is also possible for such parts to be separate and connected so as to be capable of wired or wireless communication.

4. Fundamental Operation of Control System

Figure 4:
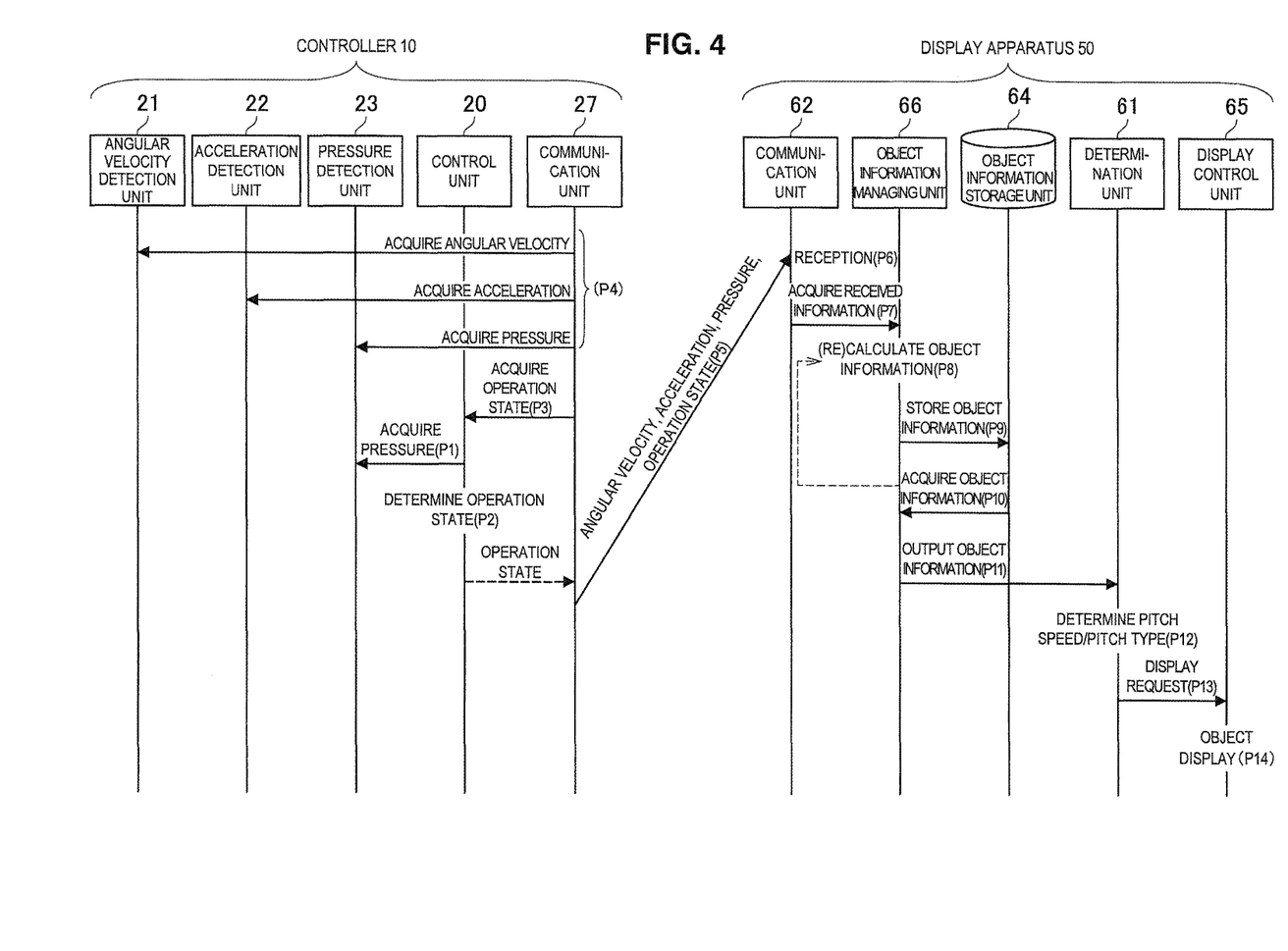
FIG. 4 is a sequence diagram showing the fundamental operation of the control system according to the present embodiment.

Next, the fundamental operation of the control system 100 according to the present embodiment will be described. FIG. 4 is a sequence chart showing the fundamental operation of the control system 100 according to the present embodiment. The left side in FIG. 4 shows a sequence of the controller 10 and the right side in FIG. 4 shows a sequence of the display apparatus 50.

The control unit 20 of the controller 10 acquires the pressure outputted from the pressure-sensitive sensors 13, for example, (P1) and determines the user operation state ("mid-operation" or "no operation") based on such pressure information (P2). In accordance with a request from the communication unit 27, the control unit 20 sends information on the user operation state to the communication unit 27 (P3).

If the operation state of the user is "mid-operation", the control unit 20 has the communication unit 27 regularly acquire the operation information, that is, the information on the angular velocity, the acceleration, and the pressure detected by the angular velocity detection unit 21, the acceleration detection unit 22, and the pressure detection unit 23 (P4), and transmit such information (information on the angular velocity, the acceleration, and the pressure, and information on the operation state) to the display apparatus 50 (P5).

At the display apparatus 50, such information is received by the communication unit 62 (P6). The received information is acquired by the acquisition unit 60 (not shown) and is passed to the object information managing unit 66 (P7). Based on such information, the object information managing unit 66 calculates object information for operating the object (P8). The object information that results from such calculation is stored in the object information storage unit 64 (P9). If the communication unit 62 has received such information two or more times, the object information managing unit 66 carries out the following processing. That is, the object information managing unit 66 reads the previous object information from the object information storage unit 64 (P10) and changes (updates) the read object information based on the newly received information.

After this, the object information managing unit 66 outputs the object information to the determination unit 61 (P11). The determination unit 61 determines at least one of the pitch velocity and the pitch type based on the inputted object information (P12), and requests the display control unit 65 to display the object based on the determined at least one of the pitch velocity and the pitch type (P13). The display control unit 65 controls the displaying of the object based on the determined at least one of the pitch velocity and the pitch type (P14). By doing so, a game is carried out where a virtual ball knocks out one of multiple targets displayed on the same screen.

5. Throw Determination Process

Figure 5:
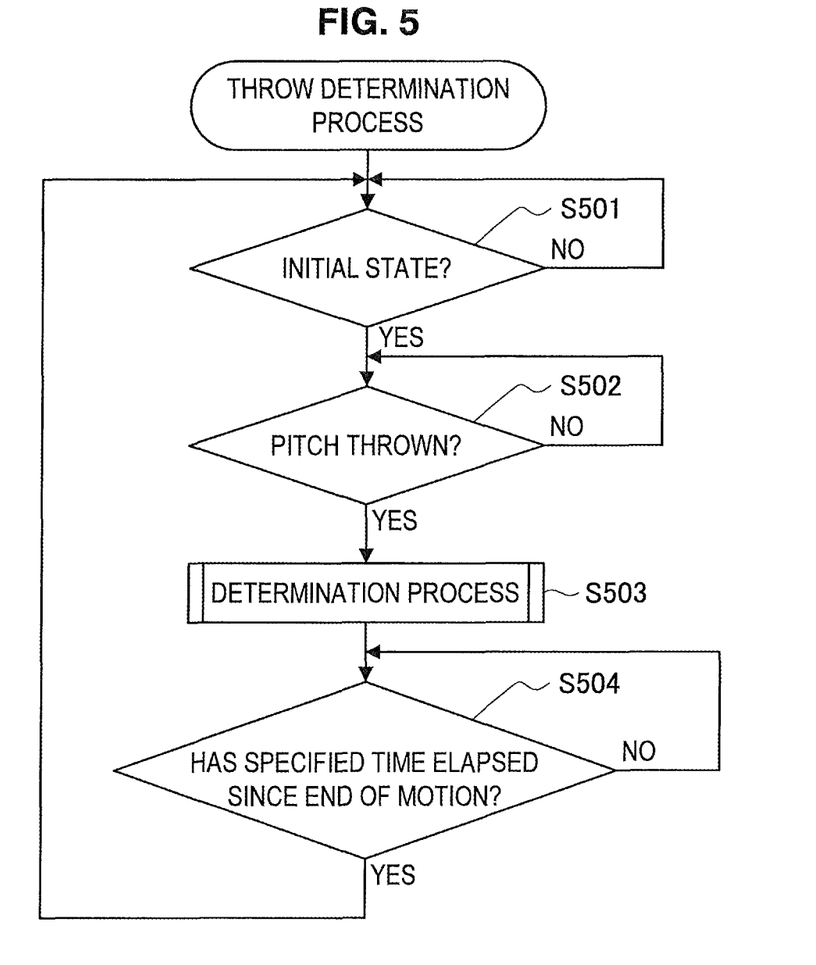
FIG. 5 is a flowchart (main routine) showing a throw determination process according to the present embodiment.

Next, a throw determination process according to the present embodiment will be described with reference to the flowcharts in FIGS. 5 and 6. In the throw determination process, first, in step S501, it is determined whether the present state is the initial state of a pitch (i.e., whether the respective sensors are not operating erroneously). The expression "initial state of a pitch" refers for example to when a button for approving an input operation incorporated in the controller has been pressed by the user or when the pressure value detected by the pressure-sensitive sensors 13 has exceeded a specified threshold. When the user has pressed the button, this shows a clear declaration of intent from the user to start pitching. When the pressure value detected by the pressure-sensitive sensors 13 has exceeded a specified threshold, this shows that the user has actually assumed a pitching position. Accordingly, in either case, the object information managing unit 66 determines that the present state is an initial state of a pitch.

Figure 8:
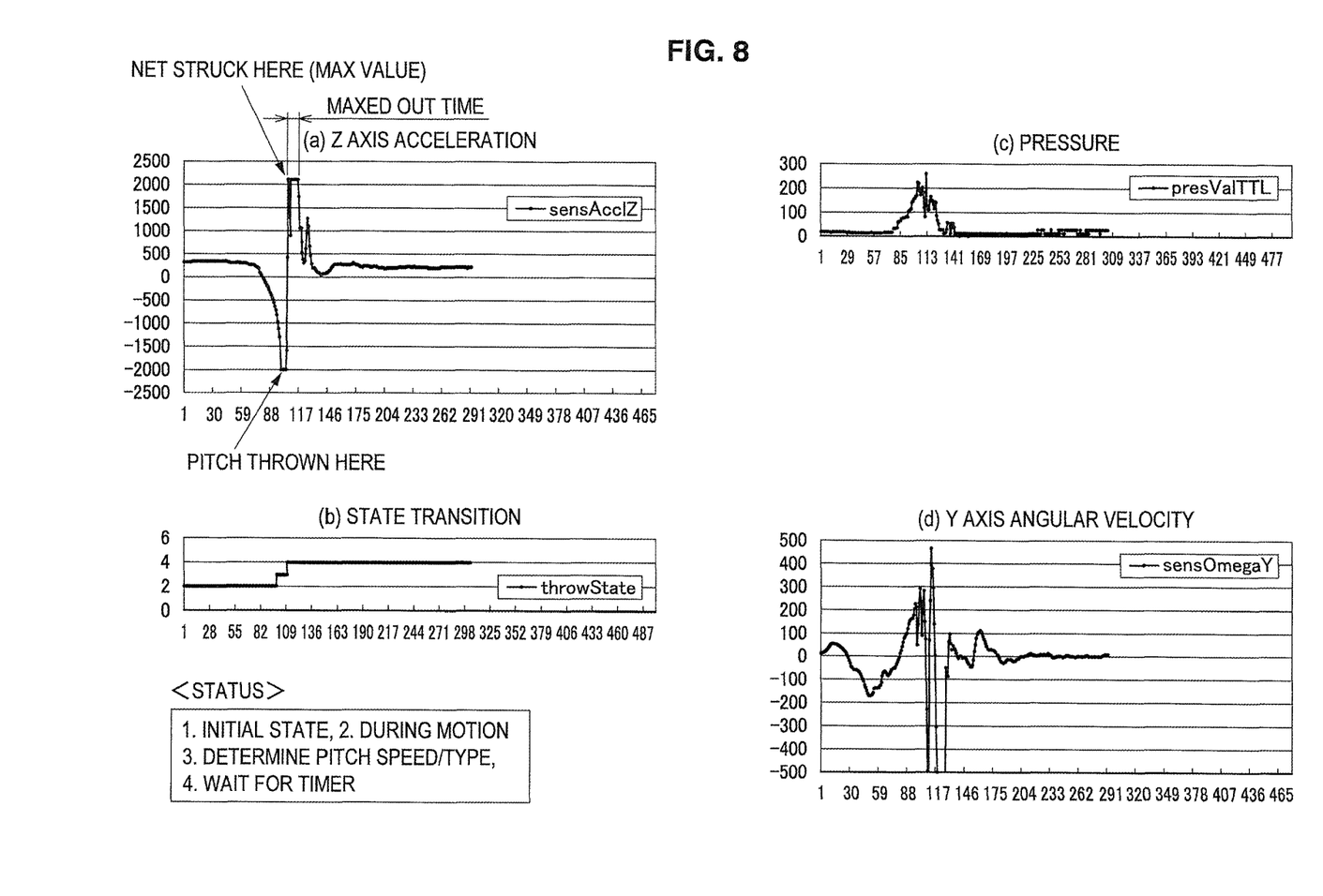
FIGS. 8A to 8D are graphs showing examples of sensor values according to the present embodiment.

Next, in step S502, the object information managing unit 66 determines whether a pitch has been thrown. For example, if the calculated acceleration has exceeded a specified threshold during motion, the object information managing unit 66 determines that a pitch has been thrown. Also, if the calculated angular velocity has exceeded a specified threshold during motion, the object information managing unit 66 determines that a pitch has been thrown. That is, the object information managing unit 66 uses at least one value out of the acceleration and the angular velocity to determine whether a pitch has been thrown. FIG. 8B shows state transitions when pitching. Status 2 is a state during motion.

If it has been determined that a pitch has been thrown, the processing proceeds to step S503 and a determination process is carried out. In the present embodiment, information on angular velocity, acceleration, pressure, and the like and information relating to the operation state are transmitted from the controller 10 to the display apparatus 50 and a determination process is carried out by the determination unit 61 of the display apparatus 50 (see the fundamental operation in FIG. 4). Status 3 in FIG. 8B is a state where the pitch velocity and pitch type are determined.

Figure 6:
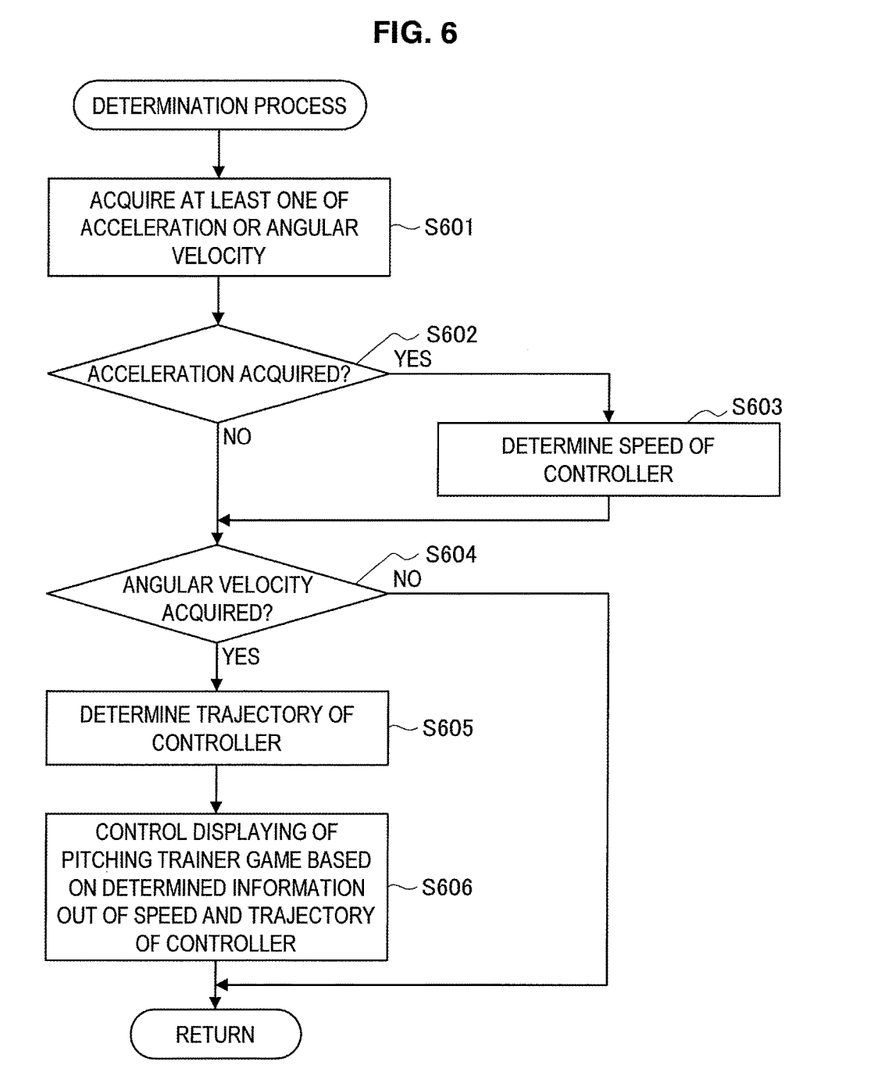
FIG. 6 is a flowchart (subroutine) showing a determination process shown in FIG. 5.

The determination process is carried out by the determination unit 61 by executing the flowchart shown in FIG. 6. First, in step 601, the acquisition unit 60 acquires the received information. Next, the determination unit 61 determines whether information on acceleration is included in the received information (step 602). If such information is included, the object information managing unit 66 determines the pitch velocity of the controller 10 based on object information calculated from the acceleration (step 603).

Next, the determination unit 61 determines whether information on the angular velocity is included in the received information (step 604). If such information is included, the object information managing unit 66 determines the pitch type of the controller 10 based on object information calculated from the angular velocity and determines the trajectory of the controller 10 from the pitch type (step 605). Next, the display control unit 65 controls the displaying of the game based on the information on at least one of the pitch velocity and the trajectory of the controller 10 and the present process ends. Here, a pitching trainer game is carried out where a virtual ball knocks out one of multiple targets displayed on a screen in keeping with the user throwing a pitch.

Returning to FIG. 5, after the determination process in step 503, the determination unit 61 of the controller 10 determines whether a specified time has elapsed since the end of motion (step 504). The determination of whether motion has ended is carried out as follows. As one example, when the calculated acceleration has dropped below a specified threshold, the control unit 20 determines that the motion has ended. The control unit 20 may also determine that the motion has ended when for example the calculated angular velocity has dropped below a specified threshold. That is, the control unit 20 carries out the determination of whether motion has ended using at least one value out of the acceleration and the angular velocity.

When determining whether the specified time has elapsed, as one example, it is possible to determine that the specified time has elapsed if, according to a timer, a specified time has elapsed from the controller 10 striking the throwing net or being caught. Status 4 in FIG. 8B is a state where the timer is measuring time. If the specified time has elapsed from the previous pitch, the sensors will have settled down. That is, until a specified time has elapsed from the previous pitch, the processing in step S504 is repeated and the next pitching process is awaited. After such time has elapsed, the processing returns to step S501 and the next pitching process starts. By doing so, it is possible to avoid erroneous operation of the application.

6. Pitch Determination Using Sensor Values

In the throw determination process described above, the determination unit determines the pitch velocity and the pitch type of the controller 10. The determination method will now be described in detail. Here, the higher the precision of such determination process, the more thoroughly erroneous operations of the application can be avoided, which makes it possible to provide an intuitive and enjoyable game.

Figure 7:
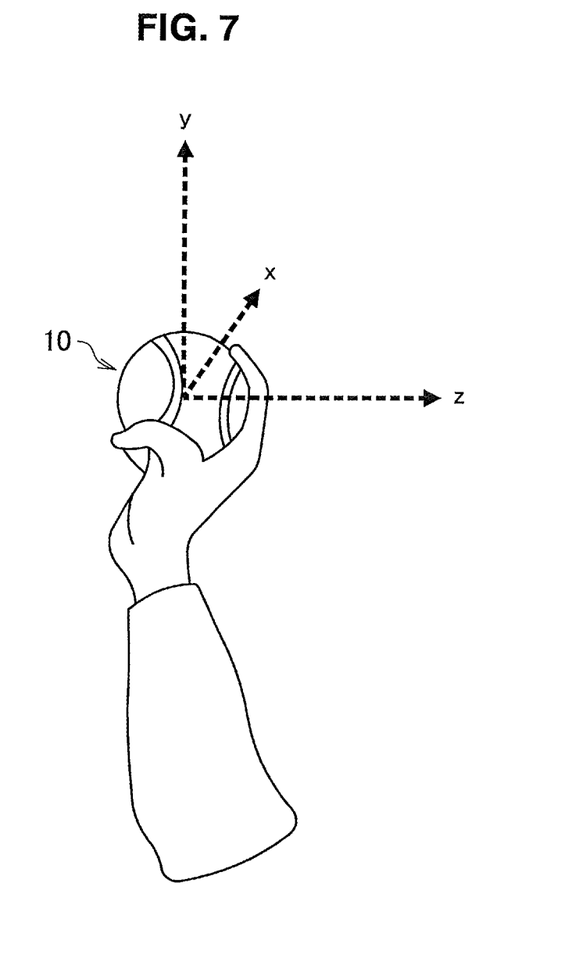
FIG. 7 is a diagram useful in explaining a pitching method and positional relationship of sensors according to the present embodiment.

Such determination is easier if the way in which the controller 10 is held is fixed. As one example, as shown in FIG. 7, the index finger and middle finger are fixed so as to lie on the Z axis, and if a pitch is thrown in this state, the acceleration will mostly appear on the Z axis. This can be detected by the acceleration detection unit 22 using the acceleration sensor 14 provided on the Z axis of the controller 10. Accordingly, the object information managing unit 66 finds the acceleration in the Z axis direction of the controller 10 according to the sensor value in the Z axis direction detected by the acceleration detection unit 22.

In this state, when the controller 10 is thrown with the right hand, rightward rotation of the hand will produce a "curveball" pitch and leftward rotation of the hand will produce a "shootball" pitch. At this time, the rotation of the controller 10 mainly appears on the Y axis. Such rotation can be detected by the angular velocity detection unit 21 using the triaxial angular velocity sensor 15 such as a gyrosensor provided on the Y axis of the controller 10. Accordingly, the object information managing unit 66 finds the rotational velocity in the Z axis direction of the controller 10 from the sensor value in the Y axis direction detected by the angular velocity detection unit 21.

The determination unit 61 detects the pitch velocity of the controller 10 from an integral value of the acceleration on the Z axis direction found by the object information managing unit 66. The determination unit 61 is also capable of determining the pitch velocity of the controller 10 to a certain extent without finding the integral value of the acceleration.

The determination unit 61 determines the pitch type of the controller 10 based on the angular velocity in the Y axis direction found by the object information managing unit 66. For example, the determination unit 61 determines a rotational state of the controller 10 based on the angular velocity in the Y axis direction and determines the pitch type so that when rightward rotation has been detected, the pitch is a "curveball", when leftward rotation has been detected, the pitch is a "shootball", and when no rotation has been detected, the pitch is a "straight" pitch.

From the above, as the minimum sensors, an acceleration sensor 14 on the Z axis and an angular velocity sensor 15 on the Y axis are necessary. The determination unit 61 uses at least one of the detected acceleration and angular velocity to specify at least one of the pitch velocity and the pitch type.

Note that if other sensors are provided in the controller 10 in addition to the acceleration sensor 14 and the angular velocity sensor 15, it is possible to raise the determination precision for the pitch velocity and the pitch type and to omit the limitation on how the controller 10 is held. For example, it is also possible to determine the pitch type according to the pressure-sensitive sensors 13. More specifically, if it has been determined that the pressure in the X axis direction of the controller 10 detected by the pressure detection unit 23 using the pressure-sensitive sensors 13 is a specified pressure or above, the determination unit 61 determines how the user is gripping the controller 10 according to the pressure on the left and right and determines whether the pitch type is a "forkball". FIG. 8A shows one example of a transition over time in the acceleration on the Z axis when a pitch is thrown, FIG. 8D shows one example of the angular velocity on the Y axis when a pitch is thrown, and FIG. 8C shows one example of the applied pressure when a pitch is thrown.

In FIG. 8A, the horizontal axis shows time and the vertical axis shows acceleration on the Z axis. It can be understood that the throwing of a pitch starts at timing where the acceleration on the Z axis suddenly falls and reaches a minimum value. After this, it can be understood that the controller 10 has struck the throwing net at the timing where the acceleration on the Z axis suddenly rises and reaches a maximum value.

When the acceleration sensor 14 has reached a maximum value, the longer the time spent at maximum, the faster the pitch velocity. In FIG. 8A, −2000 to 2000 is the measurement range of the acceleration sensor 14. Accordingly, the time spent at maximum is calculated for the MAX value where the acceleration is 2000, and it is possible to approximately calculate the pitch velocity using such calculated time. When doing so, it is possible to use a simple method that simply uses the time or an approximation method that estimates a waveform from the time. For example, it is possible to approximate and determine the velocity when the controller 10 was thrown from the time taken by the rise immediately following the throwing of the pitch.

Figure 9:
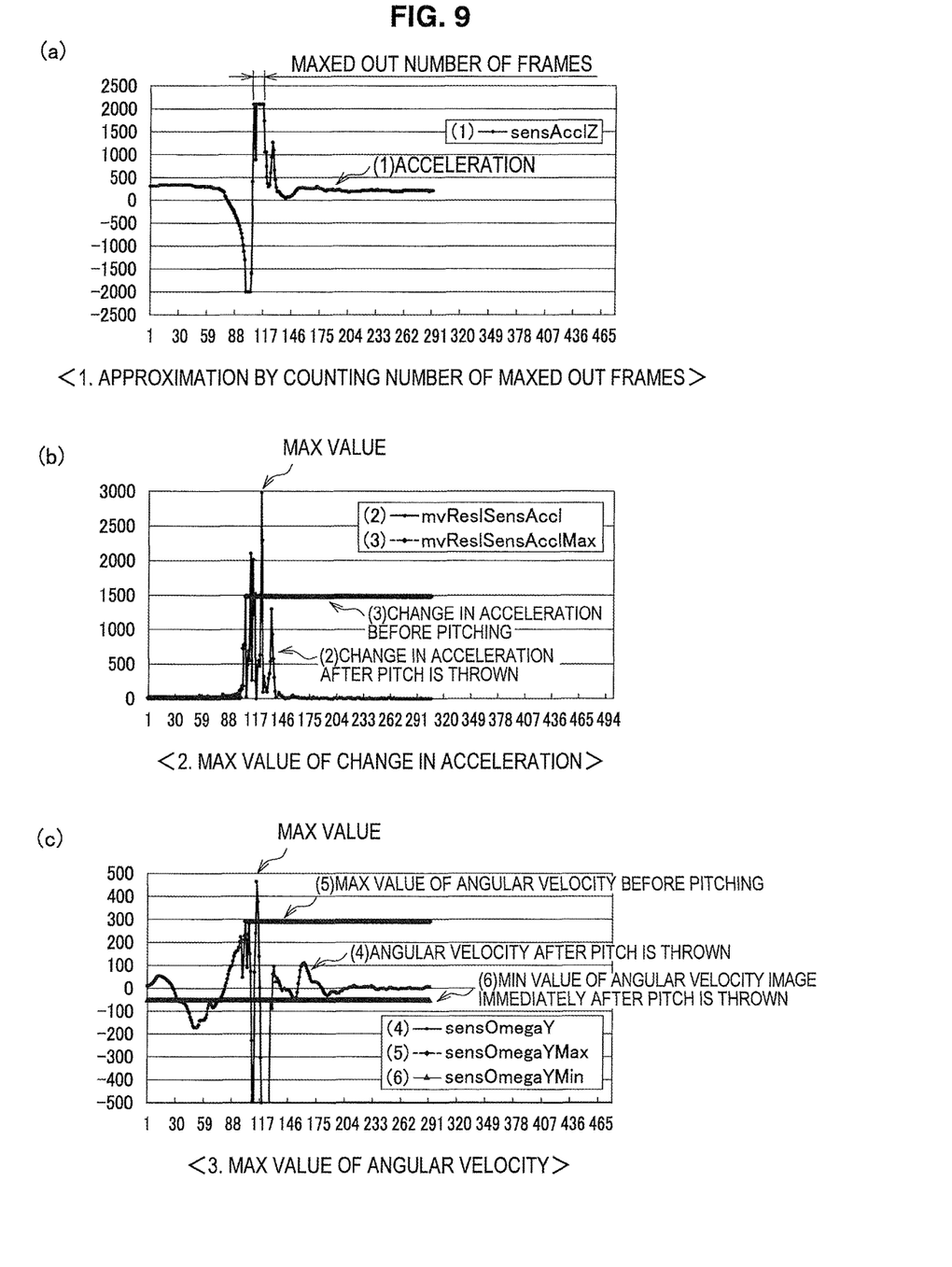
FIGS. 9A to 9C are graphs showing examples of sensor values according to the present embodiment.

Also, instead of the time for which the value of the acceleration sensor is maxed out, it is possible to use the number of frames for which the acceleration detection unit 22 on the Z axis is maxed out as shown in (1) in FIG. 9A. That is, if the MAX value of the acceleration of the controller 10 has continued for a specified time or longer, the determination unit 61 may determine that the controller 10 is in an immeasurable region for the acceleration sensor 14 that detects the acceleration, may predict the value of the acceleration sensor 14 in the immeasurable region from the time or the number of frames for which the MAX value continues, and may determine the velocity of the controller 10 from such value.

In addition, if the MAX value of the acceleration of the controller 10 has continued for a specified time or longer, the determination unit 61 may determine that the controller 10 is in an immeasurable region for the acceleration sensor 14 that detects the acceleration, may predict the value of the acceleration sensor 14 in the immeasurable region from the acquired pressure applied to the controller 10, and may determine the velocity of the controller 10 from such value. For example, the changes in pressure at the same time as the maxed out time (the immeasurable region) shown in FIG. 8A may be extracted from the detection values of pressure in FIG. 8C, the value of the acceleration sensor 14 in the immeasurable region may be predicted from the extracted pressure applied to the controller 10, and the velocity of the controller 10 may be determined from such values. The velocity of the controller 10 may also be determined using both the acceleration from the acceleration sensor 14 and the pressure value(s) from the pressure-sensitive sensors 13.

In addition, as shown in (4) of FIG. 9(c) for example, the determination unit 61 may determine the extent of rotation of the controller 10 based on the angular velocity of the controller 10. The determination unit 61 may also determine the magnitude of the rotation of the controller 10 based on the MAX value of the angular velocity of the controller 10.

If, as a determination method that reduces integration error and the like, a detection value (LocalXn) at a time n of the acceleration sensor on the X axis, a detection value (LocalYn) at the time n of the acceleration sensor on the Y axis, and a detection value (LocalZn) at the time n of the acceleration sensor on the Z axis are used, it is possible to determine the velocity of the controller 10 even more precisely than when only detection values of the acceleration sensor on the Z axis are used.

Also, the difference between the present and previous detection values of the acceleration sensor may be found and the velocity of the controller 10 may be determined from the magnitude of such difference. In this case also, by finding the differences between the present and previous acceleration values on three axes, it is possible to determine the velocity of the controller 10 more precisely than when the difference between the present and previous acceleration values on one axis is found ($DiffX_n = LocalX_n - LocalX_{n-1}$).

In addition, the determination unit 61 may determine the velocity of the controller 10 based on the change in acceleration of the controller 10 after the pitch is thrown shown by (2) in FIG. 9B for example.

$$\text{Change in acceleration} = (DiffX_n^2 + DiffY_n^2 + DiffZ_n^2)^{(1/2)}$$

As another example, the determination unit 61 may determine the velocity of the controller 10 based on the MAX value of the change in acceleration of the controller 10 shown by (2) in FIG. 9B. When doing so, the velocity is determined to be high if there is a large instantaneous change in acceleration.

Although preferred embodiments of the present disclosure have been described above in detail with reference to the attached drawings, the technical scope of the present disclosure is not limited to such embodiments. It should be understood by those skilled in the art that various modifications, combinations, sub-combinations and alterations may occur depending on design requirements and other factors insofar as they are within the scope of the appended claims or the equivalents thereof.

7. Modifications

As one example, in the embodiment described above, the display apparatus 50 is given as one example of an information processing apparatus that controls the displaying of an object (a control target, here a pitching trainer game) in accordance with a pitch velocity and pitch type of the controller 10 based on detected values detected for the movement of the controller 10 operated by the user. However, the determination unit 61 that determines the velocity and trajectory of the controller 10 based on detected values detected for the movement of the controller 10 operated by the user may be included in the controller 10. In this case, the controller 10 is one example of an "information processing apparatus", the various detection units function as an "acquisition unit", the determination result is transmitted from the controller 10 to the display apparatus 50, and the display apparatus 50 controls the displaying of the pitching trainer game based on the determination result. In this way, the information processing apparatus may be realized as the controller 10, may be realized as the display apparatus 50, or may be realized by being distributed between the controller 10 and the display apparatus 50. Accordingly, the various units of the control system 100 may be provided at the controller 10, may be provided at the display apparatus 50, or may be distributed between the controller 10 and the display apparatus 50.

Also, although the control system 100 described above is applied to a pitching trainer game, the present disclosure is not limited to this. As examples, the present disclosure may be applied to baseball, softball, soccer, volleyball, bowling, or curling. Accordingly, although the controller 10 described above is ball-shaped (spherical), the controller 10 may instead be shaped as a polyhedron or as a disc. However, the controller 10 should preferably be formed in a shape that allows intuitive operations in keeping with the application for which the controller 10 is being used.

Also, although a case where the controller 10 is wireless has been described above, the controller 10 may be connected using wires.

Also, although the pressure-sensitive sensors 13 have been given as an example in the above description, an electrostatic sensor may be used in place of the pressure-sensitive sensors 13. An electrostatic sensor is configured so as to be capable of detecting changes in electrostatic capacitance in keeping with distance, for example. By detecting the proximity of the hand when the user grips the controller 10, the electrostatic sensor is capable of detecting the force with which the controller 10 is being held. Such electrostatic sensor may be shaped as a sphere or a polyhedron, for example. The electrostatic sensor is configured so as to not contact a grip portion 23. By doing so, it is possible to prevent deterioration due to friction or the like caused by operations made by the hand.

Note that both the pressure-sensitive sensors 13 and an electrostatic sensor may be used. In such case, as one example, by using the electrostatic sensor to detect forces of a tiny magnitude that cannot be detected by the pressure-sensitive sensors 13, it is possible to realize a sensor configuration that is more sensitive (i.e., has a wider detection range).

The controller 10 may also be equipped with a power-generating device (not shown) which is capable of generating electrical power in accordance with movement and/or rotation of the controller 10 through space by the user. Alternatively, the controller 10 may be equipped with a loop coil that generates power from electromagnetic waves supplied from the outside. Such power generated by a power generating device or loop coil recharges the battery 18. By doing so, it becomes unnecessary for the user to replace the battery 18.

In the example given above, a case is described where the triaxial acceleration sensor 14 and the triaxial angular velocity sensor 15 are used as a "motion detection unit" and the pressure-sensitive sensors 13 and/or an electrostatic sensor is/are used as a "grip force detection unit". However, the motion detection unit is not limited to the triaxial acceleration sensor 14 and the triaxial angular velocity sensor 15. Other examples of the motion detection unit include a velocity sensor (such as a pitot tube), an angle sensor (such as a geomagnetic sensor), and an angular acceleration sensor. Also, although a case where both a motion detection unit and a grip force detection unit are used has been described in the above example, only one of such units may be used.

Although an example where the control target is an image that is displayed in two dimensions or three dimensions on a display has been described above, the control target is not limited to such. As one example, the control target may be an actual object such as a delivery robot or a humanoid robot.

Additionally, the present technology may also be configured as below.

(1) An information processing apparatus including:
an acquisition unit acquiring data on at least one of an acceleration or an angular velocity of a controller operated by a user; and
a determination unit determining at least one of a velocity of the controller or a trajectory of the controller based on the acquired data on the at least one of the acceleration or the angular velocity.

(2) The information processing apparatus according to (1), further including:
a display control unit controlling displaying of an object displayed on a display apparatus based on the determined at least one of the velocity of the controller or the trajectory of the controller.

(3) The information processing apparatus according to (1) or (2),
wherein the acquisition unit acquires a pressure applied to the controller operated by the user, and
wherein the determination unit determines a grip state showing how the user is gripping the controller based on the acquired pressure applied to the controller.

(4) The information processing apparatus according to any one of (1) to (3),
wherein the determination unit is operable when a max value of acceleration of the controller has continued for a specified time or longer or a specified number of frames or more, to determine an immeasurable region of an acceleration sensor that detects the acceleration, to predict a value of the acceleration sensor in the immeasurable region based on the specified time or the specified number of frames, and to determine the velocity of the controller.

(5) The information processing apparatus according to any one of (1) to (4),
wherein the determination unit is operable when a max value of acceleration of the controller has continued for a specified time or longer or a specified number of frames or more, to determine an immeasurable region of an acceleration sensor that detects the acceleration and to determine the velocity of the controller from the acquired pressure applied to the controller in the immeasurable region.

(6) The information processing apparatus according to any one of (1) to (5),
wherein the determination unit determines the velocity of the controller based on a change in the acceleration of the controller.

(7) The information processing apparatus according to any one of (1) to (6),
wherein the determination unit determines an extent of rotation of the controller based on the angular velocity of the controller.

(8) The information processing apparatus according to any one of (2) to (7),
wherein the units of the information processing apparatus are one of provided in the controller, provided in the display apparatus, or provided so as to be distributed between the controller and the display apparatus.

(9) The information processing apparatus according to any one of (1) to (8),
wherein the controller includes a sensor detecting at least one of acceleration or angular velocity as sensor values and a control unit carrying out desired computation based on the sensor values, and
wherein the acquisition unit acquires one of the sensor values detected by the sensor or results of the desired computation carried out by the control unit based on the sensor values.

(10) The information processing apparatus according to any one of (1) to (9),
wherein the control unit carries out one of computation that averages the sensor values and computation that finds a difference between the sensor values and immediately preceding sensor values, and
wherein the acquisition unit acquires data that is a result of the computation.

(11) The information processing apparatus according to any one of (1) to (10),
wherein the controller is operated by the user to change a display content of an object displayed on the display apparatus.

(12) An information processing method including:
acquiring data on at least one of an acceleration or an angular velocity of a controller operated by a user; and
determining at least one of a velocity of the controller or a trajectory of the controller based on the acquired data on the at least one of the acceleration or the angular velocity.

(13) A program for causing a computer to execute
processing of acquiring data on at least one of an acceleration or an angular velocity of a controller operated by a user, and
processing of determining at least one of a velocity of the controller or a trajectory of the controller based on the acquired data on the at least one of the acceleration or the angular velocity.

The present disclosure contains subject matter related to that disclosed in Japanese Priority Patent Application JP 2011-164068 filed in the Japan Patent Office on Jul. 27, 2011, the entire content of which is hereby incorporated by reference.

What is claimed is:
1. An information processing apparatus, comprising:
one or more processors configured to:
acquire first data on an acceleration of a controller based on a first signal from an acceleration sensor, wherein the acceleration sensor is associated with the controller, and wherein the controller is subjected to user operation;
determine a time period during which the acceleration of the controller exceeds a maximum value of a measurement range of the acceleration sensor;
acquire second data associated with a change in a pressure applied to the controller during the time period, based on a determination that the time period is greater than a threshold time period; and
output third data associated with a velocity of the controller based on the first data and the second data.

2. The information processing apparatus according to claim 1, wherein the one or more processors are further configured to:
determine a type of baseball pitch based on a movement of the controller; and
control display of an object on a display apparatus, based on the type of the baseball pitch.

3. The information processing apparatus, according to claim 2, wherein the one or more processors are one of:
  included in the controller;
  included in the display apparatus; or
  distributed among the controller and the display apparatus.

4. The information processing apparatus according to claim 2, wherein the controller is further configured to change display content of the object, based on the movement of the controller.

5. The information processing apparatus according to claim 2, wherein the one or more processors are further configured to determine a trajectory of the baseball pitch based on the type of the baseball pitch.

6. The information processing apparatus according to claim 1, wherein the one or more processors are further configured to:
  determine the pressure applied to the controller based on a second signal from a pressure sensor, wherein the pressure sensor is associated with the controller; and
  determine a grip state based on the pressure, wherein the grip state indicates a measure of a user's grip on the controller.

7. The information processing apparatus according to claim 6, wherein the one or more processors are further configured to determine the velocity of the controller based on the pressure applied to the controller over the time period.

8. The information processing apparatus according to claim 1, wherein the one or more processors are further configured to determine the velocity of the controller, based on a change in the acceleration of the controller.

9. The information processing apparatus according to claim 1, wherein the one or more processors are further configured to:
  acquire a third signal from an angular velocity sensor associated with the controller;
  acquire fourth data on an angular velocity of the controller based on the third signal; and
  determine an extent of rotation of the controller based on the fourth data.

10. The information processing apparatus according to claim 9, wherein the controller comprises the angular velocity sensor configured to detect the third signal as a plurality of sensor values.

11. The information processing apparatus according to claim 10,
  wherein the controller comprises a control unit that is configured to one of:
    determine an average value of the plurality of sensor values; or
    determine a difference between the plurality of sensor values and a plurality of preceding sensor values, and
  wherein the one or more processors are further configured to acquire the fourth data associated with the angular velocity of the controller from the control unit.

12. An information processing method, comprising:
  in an information processing apparatus:
    acquiring first data on an acceleration of a controller based on a first signal from an acceleration sensor, wherein the acceleration sensor is associated with the controller, and wherein the controller is subjected to user operation;
    determining a time period during which the acceleration of the controller exceeds a maximum value of a measurement range of the acceleration sensor;
    acquiring second data associated with a change in a pressure applied to the controller during the time period, based on a determination that the time period is greater than a threshold time period; and
    outputting third data associated with a velocity of the controller based on the first data and the second data.

13. The method according to claim 12, further comprising:
  determining a type of baseball pitch based on a movement of the controller; and
  controlling display of an object on a display apparatus, based on the type of the baseball pitch.

14. The method according to claim 13, further comprising:
  determining a trajectory of the baseball pitch based on the type of the baseball pitch.

15. The method according to claim 12, further comprising determining the velocity of the controller, based on a change in the acceleration of the controller.

16. The method according to claim 12, further comprising:
  acquiring a third signal from an angular velocity sensor associated with the controller;
  acquiring fourth data on an angular velocity of the controller based on the third signal; and
  determining an extent of rotation of the controller based on the fourth data.

17. The method according to claim 12, further comprising:
  determining the pressure applied to the controller, based on a second signal from a pressure sensor, wherein the pressure sensor is associated with the controller; and
  determining a grip state based on the pressure, wherein the grip state indicates a measure of a user's grip on the controller.

18. The method according to claim 17, further comprising:
  determining the velocity of the controller based on the pressure applied to the controller over the time period.

19. A non-transitory computer-readable medium having stored thereon computer-executable instructions, which when executed by a computer, cause the computer to execute operations, the operations comprising:
  acquiring first data on an acceleration of a controller based on a first signal from an acceleration sensor, wherein the acceleration sensor is associated with the controller, and wherein the controller is subjected to user operation;
  determining a time period during which the acceleration of the controller exceeds a maximum value of a measurement range of the acceleration sensor;
  acquiring second data associated with a change in a pressure applied to the controller during the time period, based on a determination that the time period is greater than a threshold time period; and
  outputting third data associated with a velocity of the controller based on the first data and the second data.

20. The non-transitory computer-readable medium according to claim 19, further comprising:
  determining a type of baseball pitch based on a movement of the controller; and
  controlling display of an object on a display apparatus, based on the type of the baseball pitch.

* * * * *